US009910650B2

(12) United States Patent
Hartono et al.

(10) Patent No.: US 9,910,650 B2
(45) Date of Patent: Mar. 6, 2018

(54) METHOD AND APPARATUS FOR APPROXIMATING DETECTION OF OVERLAPS BETWEEN MEMORY RANGES

(71) Applicant: Intel Corporation, Santa Clara, CA (US)

(72) Inventors: Albert Hartono, Santa Clara, CA (US); Nalini Vasudevan, Sunnyvale, CA (US); Sara S. Baghsorkhi, San Jose, CA (US); Cheng Wang, San Ramon, CA (US); Youfeng Wu, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 135 days.

(21) Appl. No.: 14/497,157

(22) Filed: Sep. 25, 2014

(65) Prior Publication Data
US 2016/0092285 A1    Mar. 31, 2016

(51) Int. Cl.
*G06F 9/45*    (2006.01)
*G06F 9/455*    (2006.01)

(52) U.S. Cl.
CPC ............ *G06F 8/452* (2013.01); *G06F 9/4552* (2013.01)

(58) Field of Classification Search
CPC .............................. G06F 8/452; G06F 9/4552
USPC ................. 717/149, 150, 151, 154
See application file for complete search history.

(56) References Cited

U.S. PATENT DOCUMENTS

| 4,677,547 | A | * | 6/1987 | Omoda | G06F 15/8053 |
| | | | | | 712/6 |
| 5,168,573 | A | * | 12/1992 | Fossum | G06F 9/3012 |
| | | | | | 712/4 |
| 5,296,759 | A | * | 3/1994 | Sutherland | H03K 17/223 |
| | | | | | 326/37 |
| 5,473,577 | A | * | 12/1995 | Miyake | G11C 7/103 |
| | | | | | 365/189.04 |
| 7,433,898 | B1 | * | 10/2008 | Georgiev | G06F 11/203 |
| 7,571,216 | B1 | * | 8/2009 | McRae | G06F 13/28 |
| | | | | | 709/213 |
| 8,316,216 | B2 | * | 11/2012 | Espasa | G06F 12/0844 |
| | | | | | 712/24 |
| 2001/0054121 | A1 | * | 12/2001 | Proch | G06F 3/0614 |
| | | | | | 710/57 |
| 2002/0071325 | A1 | * | 6/2002 | Hii | G01R 31/30 |
| | | | | | 365/201 |

(Continued)

FOREIGN PATENT DOCUMENTS

| TW | 201339960 A | 10/2013 | |
| WO | 2013/095606 A1 | 6/2013 | |
| WO | WO 2013095606 A1 | * 6/2013 | ......... G06F 9/30018 |

OTHER PUBLICATIONS

CPlusPlusCom—"Vector—C++Reference"—Located at: http://www.cplusplus.com/reference/vector/vector/—2015.*

(Continued)

*Primary Examiner* — Hossain Morshed
(74) *Attorney, Agent, or Firm* — L. Cho

(57) ABSTRACT

A computer-implemented method for managing loop code in a compiler includes using a conflict detection procedure that detects across-iteration dependency for arrays of single memory addresses to determine whether a potential across-iteration dependency exists for arrays of memory addresses for ranges of memory accessed by the loop code.

21 Claims, 10 Drawing Sheets

(56) References Cited

U.S. PATENT DOCUMENTS

| | | | | |
|---|---|---|---|---|
| 2004/0205409 A1* | 10/2004 | Wu | ................... | G06F 8/443 |
| | | | | 714/38.13 |
| 2004/0268334 A1* | 12/2004 | Muthukumar | ........ | G06F 8/4452 |
| | | | | 717/160 |
| 2008/0114970 A1* | 5/2008 | Colavin | .............. | G06F 9/30076 |
| | | | | 712/226 |
| 2008/0288754 A1* | 11/2008 | Gonion | .............. | G06F 9/30072 |
| | | | | 712/217 |
| 2009/0013148 A1* | 1/2009 | Eggleston | ........... | G06F 12/0246 |
| | | | | 711/203 |
| 2010/0318769 A1* | 12/2010 | Greyzck | ................. | G06F 8/445 |
| | | | | 712/214 |
| 2011/0029962 A1* | 2/2011 | Nuzman | ................. | G06F 8/452 |
| | | | | 717/160 |
| 2012/0131309 A1* | 5/2012 | Johnson | ................... | G06F 9/30 |
| | | | | 712/41 |
| 2012/0159130 A1* | 6/2012 | Smelyanskiy | ........ | G06F 9/3887 |
| | | | | 712/216 |
| 2014/0089634 A1* | 3/2014 | Lee | ..................... | G06F 9/30018 |
| | | | | 712/5 |
| 2015/0268940 A1* | 9/2015 | Baghsorkhi | ............. | G06F 8/452 |
| | | | | 717/160 |

OTHER PUBLICATIONS

Gallagher, "Dynamic Memory Disambiguation Using the Memory Conflict Buffer", Oct. 1994, ASPLOS-VI Proceedings.*

Jayashankar Bharadwaj, et al., "Methods and Systems to Vectorize Scalar Computer Program Loops Having Loop-Carried Dependences", U.S. Appl. No. 13/994,062, filed Aug. 11, 2014, 149 pages.

* cited by examiner

```
/* Iteration order starts from left to right */
          i =   0   1   2   3
       j=B[i] = 16  28  68  74 vStart = 16  28  68  74
         vEnd = 24  36  76  82
    numShifts = ⌈log₂(9)⌉ = 4
 vStartBuckets = 1   1   4   4
   vEndBuckets = 1   2   4   5
           k1 = 0   1   0   1    /* start <- start */
           k2 = 0   0   0   0    /* start <- end */
           k3 = 0   1   0   1    /* end <- start */
           k4 = 0   0   0   0    /* end <- end */
     kConflict = 0   1   0   1
```

FIG. 9

/* Iteration order starts from left to right */

$$\begin{aligned}
i = &\ 0\ \ 1\ \ 2\ \ 3 \\
j = B[i] = &\ 16\ \ 30\ \ 74\ \ 90 \\
\\
vStart = &\ 16\ \ 30\ \ 74\ \ 90 \\
vEnd = &\ 24\ \ 38\ \ 92\ \ 98 \\
numShifts = &\ \lceil \log_2(9) \rceil + 1 = 5 \\
vStartBuckets = &\ 0\ \ 0\ \ 2\ \ 2 \\
vEndBuckets = &\ 0\ \ 1\ \ 2\ \ 3 \\
k1 = &\ 0\ \ 1\ \ 0\ \ 1 \quad \text{/* start <- start */} \\
k2 = &\ 0\ \ 0\ \ 0\ \ 0 \quad \text{/* end <- end */} \\
kConflict = &\ 0\ \ 1\ \ 0\ \ 1
\end{aligned}$$

FIG. 10

METHOD AND APPARATUS FOR APPROXIMATING DETECTION OF OVERLAPS BETWEEN MEMORY RANGES

TECHNICAL FIELD

An embodiment of the present disclosure pertains to vectorization of code by compilers. More specifically, an embodiment of the present disclosure relates to a method and apparatus for approximating detection of overlaps between memory ranges from loops in code to be vectorized.

BACKGROUND

Early computers generally utilized a scalar processor that included a single logic unit that sequentially executed a single instruction on a single operand pair at a time. Computer programs and programming languages were accordingly designed to execute sequentially. Modern computers today may now include a vector processor that executes more than one instruction at a time. The vector processor may include a central processing unit that implements an instruction set having instructions that operate on one-dimensional arrays of data called vectors. Vector processors can greatly improve performance on certain workloads such as numerical simulation and similar tasks.

Some optimizing compilers feature automatic vectorization. Automatic vectorization is a compiler feature where particular parts of sequential programs are transformed into equivalent parallel programs to produce code which utilize a vector processor. Automatic vectorization in parallel computing is a special case of automatic parallelization where a computer program is converted from a scalar implementation which processes a single pair of operands at a time, to a vector implementation which processes one operation on multiple pairs of operands at once.

Vectorization can lead to gains without programmer intervention, especially on large data sets. Vectorization can sometimes also lead to slow execution because of pipeline synchronization, data movement timing, and other issues.

BRIEF DESCRIPTION OF THE DRAWINGS

The features and advantages of embodiments of the present disclosure are illustrated by way of example and are not intended to limit the embodiments of the present disclosure to the particular embodiments shown.

FIG. 9 illustrates a first example of performing conflict detection according to an exemplary embodiment of the present disclosure.

FIG. 10 illustrates a second example of performing conflict detection according to an exemplary embodiment of the present disclosure.

DETAILED DESCRIPTION

Figure 1:
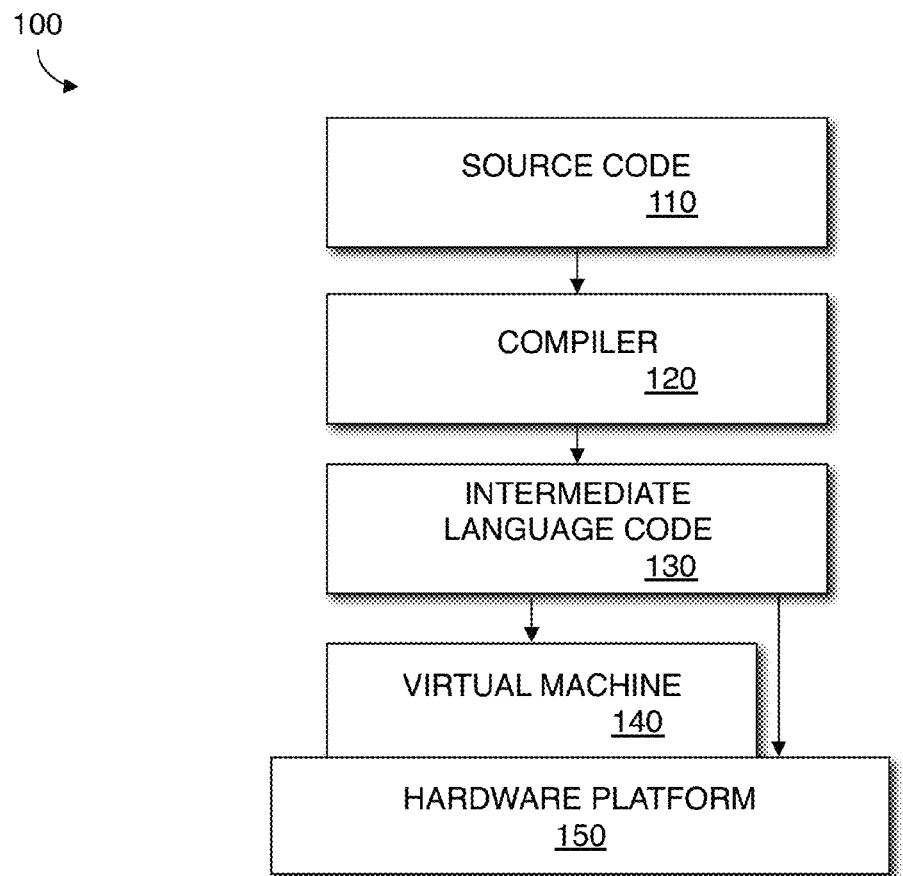
FIG. 1 is a block diagram of a software compilation and execution system according to an exemplary embodiment of the present disclosure.

Loop vectorization converts procedural loops that iterate over multiple pairs of data items and assigns a separate processing unit to each pair. Programs may spend a large amount of execution times within such loops. Vectorizing loops can lead to significant performance improvements, especially on large data sets. Some loops, however, may include memory dependencies which result in conflicts in memory accesses. The conflicts in memory accesses may prevent the loop vectorization from generating correct results. Consider the following example.

for (i=0; i<=N−1; i++)
    A[B[i]]=A[B[i]]+C[i];

The loop above has a read from and a write to A[B[i]]. Two different iterations i1 and i2 may read and write to the same location of array A when B[i1] and B[i2] evaluate to an identical value. This prevents traditional vectorization due to across-iteration read-after-write (RAW) dependency. It should be appreciated that across-iteration dependency may also occur for write after write and write after read operations.

In some instances where the memory dependencies occur infrequently during runtime, it may still be beneficial for a performance perspective to use a runtime dependence detection procedure ("conflict detection procedure") to identify when a conflict occurs, and partition the loop to eliminate the conflict. The conflict detection procedure may be an instruction that performs runtime memory aliasing checks to facilitate vectorization. For example, a conflict detection procedure vconflict (v1, v2) may take two vector registers, v1 and v2, that includes the memory addresses to be checked, and outputs a mask or predicate that describes cross-iteration memory dependencies. The conflict detection procedure performs a comparison between each read address with each previous write address to identify the memory dependencies. The comparisons may be either triangle comparisons or end to end comparisons to identify duplicate values stored in the arrays. Consider the following example which includes eight scalar iteration of the exemplary loop above.

```
/*Iteration order starts from left to right*/
              i = 0 1 2 3 4 5 6 7
             vB = 1 3 5 7 3 7 7 8
    k = vconflict (vB, vB) = 0 0 0 0 1 0 1 0
          /* LSB is leftmost; MSB is rightmost */
```

In the example described above, vector register vB includes index values of array A (i.e., B[i:i+VL−1], where VL is the vector length. The output, k, of conflict detection procedure, vconflict, is a mask register with a hex value of 0xA0. This value shows that there are two conflicting memory locations between iterations i=4 and i=1, and also between iterations i=6 and i=5. With the information provided by the output of vconflict, the compiler can vectorize the loop by dynamically partitioning the vector into three smaller partitions: scalar iterations 0-3, 4-5, and 6-7. A vector partitioning loop may be inserted by the compiler inside the vectorized loop to perform dynamic partitioning.

According to an embodiment of the present disclosure, the conflict detection procedure is a uni-directional comparison instruction that detects conflicts between elements in two vectors or arrays, v1 and v2. The conflict detection procedure compares each element in v1 to each preceding element in v2 from a point of last conflict and sets a mask if any of the comparisons return true. It should be appreciated, however, that other techniques may be used by the conflict detection procedure.

Challenges may arise when a loop accesses ranges of memory addresses, rather than a single memory address. Each range of memory addresses may include a block of contiguous memory addresses. Consider the following example.

```
for (i = 0; i <= N-1; i++){
    j = B[i];
    A[j] = A[j] + C[i];
    A[j+1] = A[j+1] + C[i+1];
    A[j+2] = A[j+2] + C[i+2];
    ...
    A[j+7] = A[j+7] + C[i+7];
    A[j+8] = A[j+8] + C[i+8];
}
```

In each scalar iteration of the loop above, there are 9 reads from and 9 writes to A[j], A[j+1], A[j+2], . . . , A[j+8], where j=B[i]. Non-empty overlaps between memory ranges A[j:j+8] across different iterations indicates existence of memory conflicts. One approach to resolving memory aliasing for the type of loop described above is to apply the conflict detection instruction 81 times for all possible pairs of reads and writes. This approach, however, is not scalable and may lead to performance degradation due to the overhead associated with using the conflict detection instruction.

Another approach to resolving the memory aliasing for the type of loop described above is to introduce an instruction that takes two vector registers that includes the starting addresses of memory ranges being checked, v1 and v2, and two immediate values that denote the lengths of the memory ranges, I1 and I2. The I1 and I2 values are used to compute the ending addresses of the corresponding ranges. This instruction returns a mask or predicate of some form that indicates cross-iteration memory dependencies, when a non-empty intersection is present between one memory range and any preceding memory range. This approach, however, may be costly to implement in hardware due to the complex inequality comparisons between starting and ending addresses of the memory ranges.

According to an embodiment of the present disclosure, a method and apparatus for approximating detection of overlaps between memory ranges is disclosed that operates on arrays of memory addresses for ranges of memory rather than on an array of single memory address. An array of starting addresses and an array of ending addresses of the memory ranges are mapped to a smaller fixed set of data. A mapped array of the starting addresses and a mapped array of ending addresses for the ranges of memory are cross-checked using a conflict detection procedure that detects across-iteration dependency for arrays of single memory addresses. The cross-checking determines if there are collisions within the set of data. If a collision is detected, then a potential conflict between the compared memory ranges exists. Due to the mapping of the memory range to the smaller fixed set of data, this approach provides an approximation of potential conflict since false positives may result.

Embodiments of the present disclosure may provide potential advantages such as utilizing existing conflict detection procedures/instructions that detect across-iteration dependency for arrays of single memory addresses supported by existing hardware to reduce a number of the conflict detection procedures/instructions that need to be implemented. This reduces instruction overhead and improves overall performance of executing vectorized loops. Embodiments of the present disclosure also provide the potential advantage of being able to operate on memory addresses that are read from and written to that may be properly aligned or unaligned.

FIG. 1 illustrates a software program compilation and execution system 100 according to an embodiment of the present disclosure. The software program compilation and execution system 100 includes a compiler 120 that compiles source code 110 into an intermediate language code 130. The source code 110 may be, for example, Java. The intermediate language code 130 may be, for example, Java byte-code or Common Intermediate Language code. According to an embodiment of the present disclosure, the compiler 120 is a software system that is run on a computer system and the intermediate language code 130 is stored in a memory of the computer system, a hard drive, or downloaded from an external source.

The software program compilation and execution system 100 includes a virtual machine 140 and a hardware platform 150. The virtual machine 140 further compiles the intermediate language code 130 into native code. According to an embodiment of the present disclosure, native code is machine code that is particular to a specific architecture or platform. The virtual machine 140 may be implemented as a software system. In this embodiment, the virtual machine 140 runs on the hardware platform 150. The virtual machine 140 may be, for example, a Java virtual machine, a small talk runtime system, or other runtime system. Alternatively, the virtual machine 140 may be implemented using other techniques (e.g., as a firmware system). It should be appreciated that embodiments of the disclosure may be implemented in part by a static compiler or a JIT compiler.

The hardware platform 150 executes the native code compiled by the virtual machine 140. The hardware platform 150 may be implemented, for example, by a personal computer, a personal digital assistant, a network computer, a server computer, a notebook computer, a mobile device, a workstation, a mainframe computer, or a supercomputer. Alternatively, the hardware platform 150 may be implemented by any other electronic system with data processing capabilities. The intermediate language code 130 may be delivered to the hardware platform 150 via a communication link such as a local area network, the Internet, or a wireless communication network.

Figure 2:
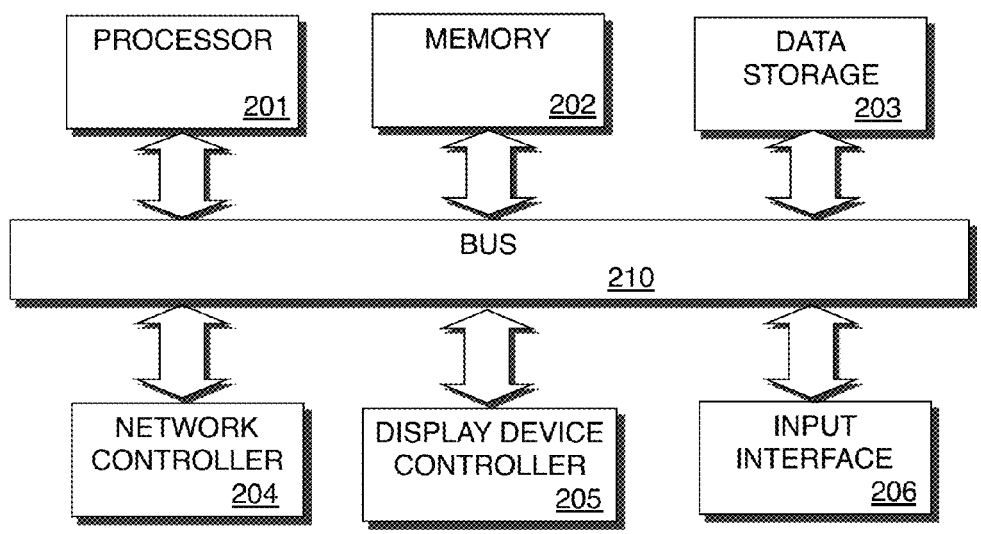
FIG. 2 is a block diagram of a hardware platform according to an exemplary embodiment of the present disclosure.

FIG. 2 is a block diagram of an exemplary computer system 200 according to an embodiment of the present disclosure. The computer system 200 may be used to implement the hardware platform 150 shown in FIG. 1. The computer system 200 includes a processor 201 that processes data signals. FIG. 2 shows the computer system 200 with a single processor. However, it is understood that the computer system 200 may operate with multiple processors. According to an embodiment of the present disclosure, the processor 201 may implement thread-level-parallelism to increase utilization of processor execution resources. By utilizing simultaneous multi-threading technology, multiple threads of software applications may be run simultaneously on the processor 201.

The processor 201 is coupled to a bus 210 that transmits data signals between components in the computer system 200. The bus 210 may be a single bus or a combination of multiple buses. The computer system 200 includes a memory 202. The memory 202 may be a dynamic random access memory device, a static random access memory device, and/or other memory device. The memory 202 may store instructions and code represented by data signals that may be executed by the processor 201. According to an embodiment of the present disclosure, a virtual machine, such as virtual machine 140, may reside in memory 202 and be executed by the processor 201. A data storage device 203 is coupled to the bus 210. The data storage device 203 may be a hard disk drive, a floppy disk drive, a CD-ROM device, a flash memory device or other mass storage device.

A network controller 204 is coupled to the bus 210. The network controller 204 may link the computer system 200 to a network of computers (not shown) and supports communication among the machines. A display device controller 205 is coupled to the bus 210. The display device controller 205 allows coupling of a display device (not shown) to the computer system 200 and acts as an interface between the display device and the computer system 200. An input interface 206 is coupled to the bus 210. The input interface 206 may be, for example, a keyboard and/or mouse controller or other input interface. The input interface 206 allows coupling of an input device to the computer system 200 and transmits data signals from an input device to the computer system 200. It should be appreciated that computer systems having a different architecture or having different components may also be used to implement the computer system 200.

Figure 3:
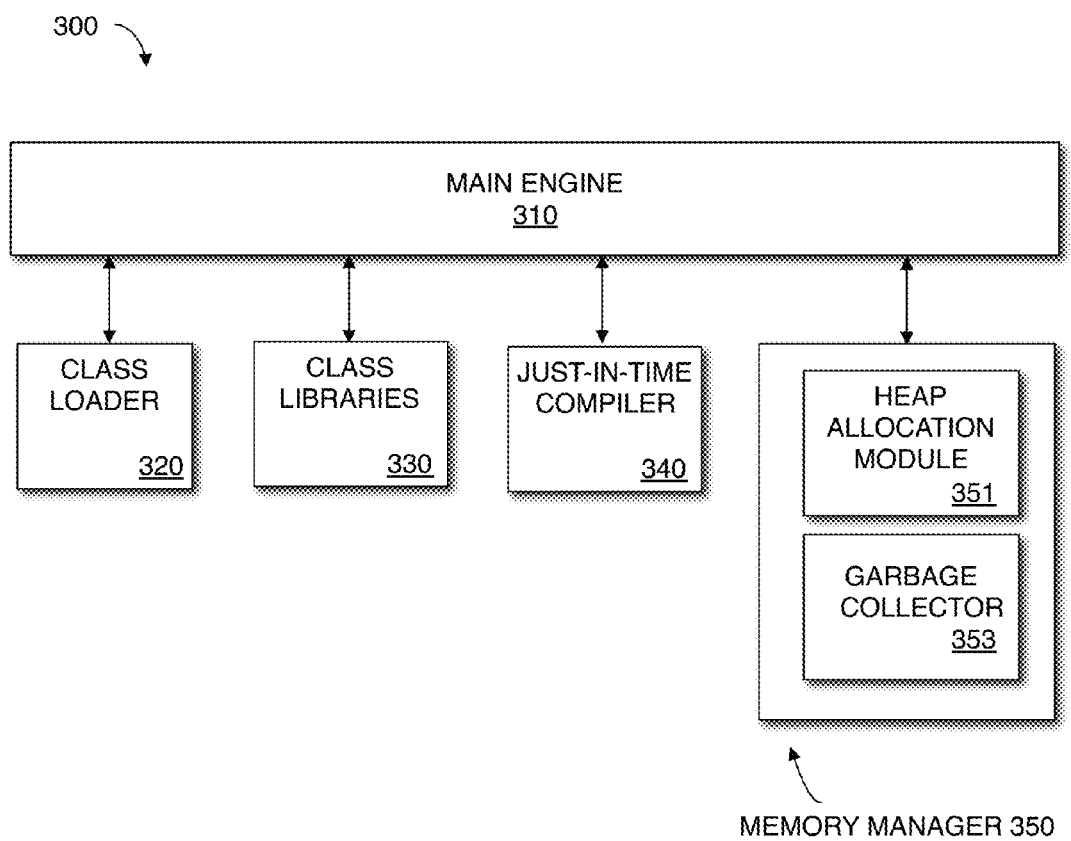
FIG. 3 is a block diagram of a virtual machine according to an exemplary embodiment of the present disclosure.

FIG. 3 is a block diagram of a virtual machine 300 according to an embodiment of the present disclosure. The virtual machine 300 maybe implemented as the virtual machine 140 shown in FIG. 1. The virtual machine 300 includes a main engine 310. The main engine 310 may be employed as the main core of the virtual machine 300. The main engine 310 monitors compilation and execution of the intermediate language code, and coordinates use of other modules in the virtual machine 300 when required. The main engine 310 also supports software transaction memory to allow instructions in a transaction to be seen logically as executing in the same instance of time.

The virtual machine 300 includes a class loader 320. The class loader 320 may be used to load classes. The class loader 320 may also perform other functions associated with loading classes. For example, the class loader 320 may also verify loaded classes.

The virtual machine 300 includes class libraries 330. The class libraries 330 may be used to store shared classes when a program may include more than one type of class, (i.e., application-specific class and shared class).

The virtual machine 300 includes a just-in-time compiler 340. The just-in-time compiler 340 may compile intermediate language code to generate native or machine code at runtime that is executed by a hardware platform. According to an embodiment of the present disclosure, "just-in-time" refers to the just-in-time compiler 340 compiling or translating each method or class when it is used for execution into native code. The just-in-time compiler 340 may also store some compiled native code in a just-in-time in-memory cache (not shown in FIG. 3). In this manner, the virtual machine 300 may re-use native code associated with a previously compiled method or object that is invoked or called more than once.

The virtual machine 300 includes a memory manager 350. The memory manager 350 may be used to manage a specific memory space within the memory referred to as heap or heap space. The memory manager 350 includes a heap allocation module 351 and a garbage collector 353. The heap allocation module 351 is used to allocate objects from the heap space in the memory. The garbage collector 353 is used to reclaim memory space in the heap used by objects that are no longer referenced by an application or method. Additionally, the garbage collector 353 also may move objects to reduce heap fragmentation. The memory manager 350 interacts with the main engine 310 and the just-in-time compiler 340.

The main engine 310, class loader 320, class libraries 330, just-in-time compiler 340, and memory manager 350 may be implemented using any known technique or circuitry. It should be appreciated that other components may also be implemented in the virtual machine 300.

Figure 4:
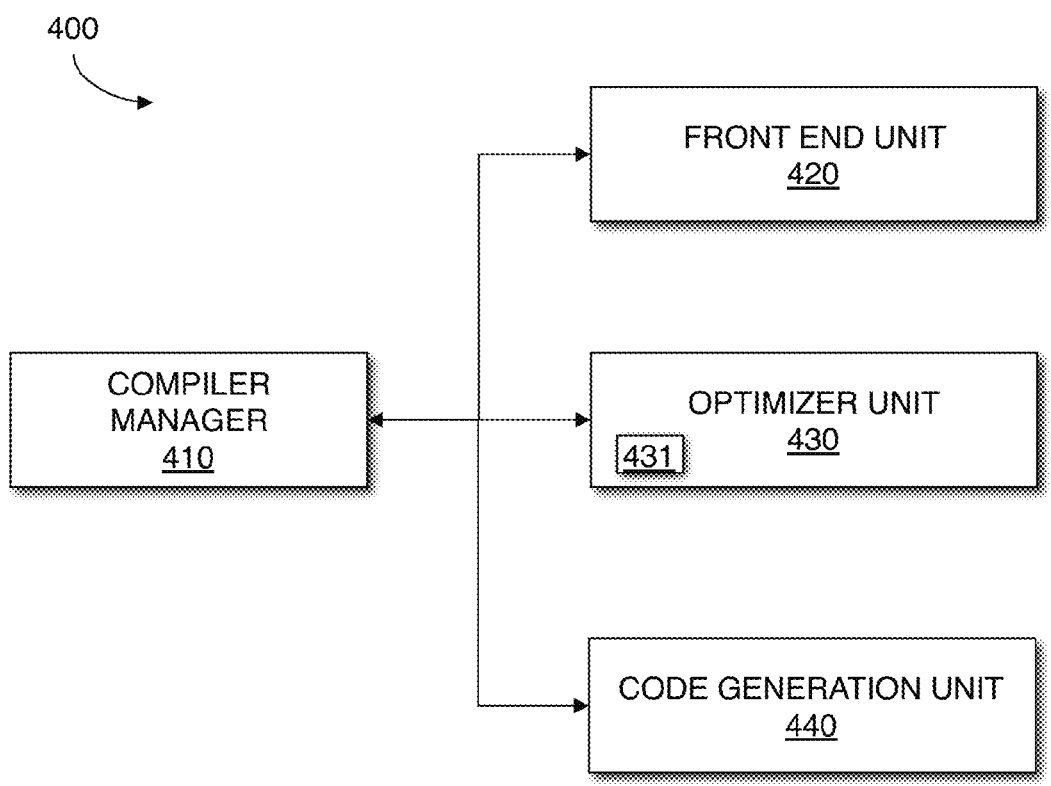
FIG. 4 is a block diagram of a just-in-time compiler according to an exemplary embodiment of the present disclosure.

FIG. 4 is a block diagram of a just-in-time compiler 400 according to an embodiment of the present disclosure. The just-in-time compiler 400 may be used to implement the just-in-time compiler 340 shown in FIG. 3. The just-in-time compiler 400 includes a compiler manager 410. The compiler manager 410 receives intermediate language code, such as Java byte-code or Common Intermediate Language code, to compile. The compiler manager 410 interfaces with and transmits information between other components in the just-in-time compiler 400.

The just-in-time compiler 400 includes a front end unit 420. According to an embodiment of the just-in-time compiler 400, the front end unit 420 operates to parse the intermediate language code and to convert it to an abstract syntax tree.

The just-in-time compiler 400 includes an optimizer unit 430. The optimizer unit 430 may utilize one or more optimization procedures to optimize the intermediate language code. According to an embodiment of the just-in-time compiler 400, the optimizer unit 430 may perform peephole, local, loop, global, interprocedural and/or other optimizations.

According to an embodiment of the present disclosure, a vectorization unit 431 resides in the optimizer unit 430. The vectorization unit 431 may identify loops in the vectorized code with conflicts and detect across-iteration dependency for arrays of single memory addresses and potential across-iteration dependency for arrays of memory addresses for ranges of memory accessed by loops in the vectorized code. The vectorization unit 431 may vectorize the loop and partition the vectorized loop in response to the identified conflicts or potential conflicts arising from the across-iteration dependencies. It should be appreciated that embodiments of the disclosure may also be implemented using resources other than compilers or machines and be implemented in part or in whole by handcoding.

The just-in-time compiler 400 includes a code generation unit 440. The code generation unit 440 converts the intermediate representation into machine or assembly code that is native to a local processor.

The just-in-time compiler 400 is shown to be implemented with a compiler manager 410, front end unit 420, optimizer unit 430, and code generation unit 440. It should be appreciated that the just-in-time compiler 400 may be implemented with a subset of the components described with reference to FIG. 4. It should also be appreciated that other components may reside in the just-in-time compiler 400.

Figure 5:
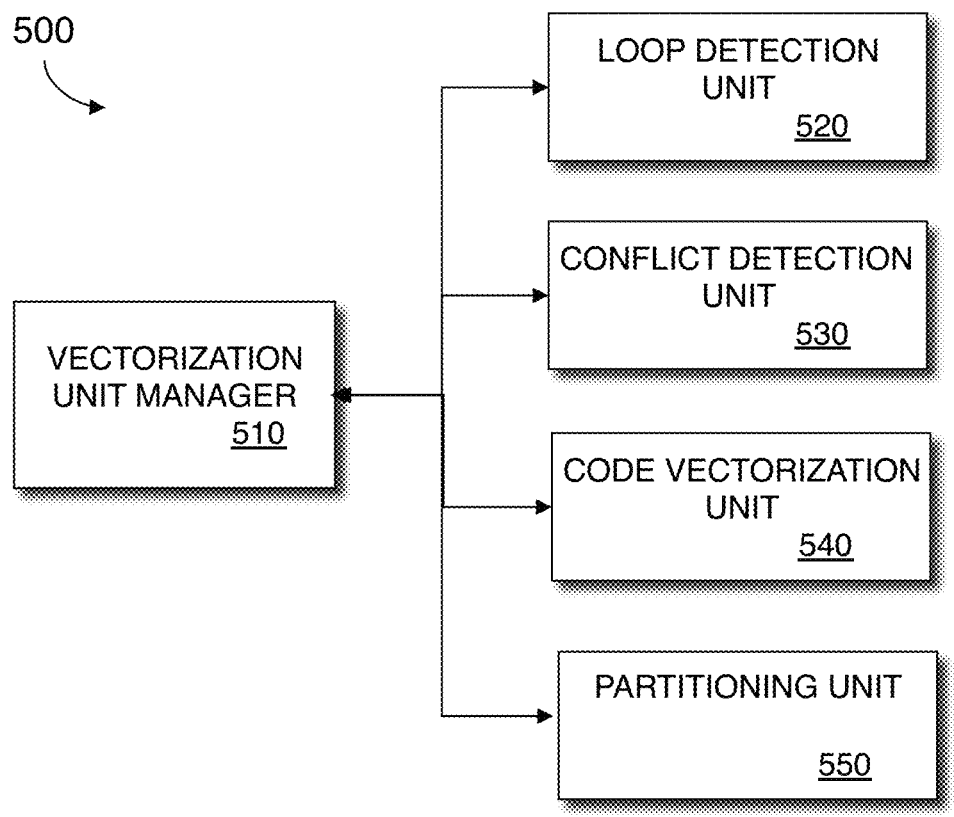
FIG. 5 is a block diagram of a code vectorization unit according to an exemplary embodiment of the present disclosure.

FIG. 5 is a block diagram of a vectorization unit 500 according to an exemplary embodiment of the present disclosure. The vectorization unit 500 may be used to implement the vectorization unit 431 shown in FIG. 4. The vectorization unit 500 includes a vectorization unit manager 510. The vectorization unit manager 510 is coupled to and transmits information between components in the vectorization unit 500.

The vectorization unit 500 includes a loop detection unit 520. The loop detection unit 520 parses the intermediate language code and identifies loops. According to an embodiment of the present disclosure, the loop detection unit 520 identifies loops in the intermediate language code with conflicts.

The vectorization unit 500 includes a conflict detection unit 530. The conflict detection unit 530 receives identified loops or identified loops with conflicts from the loop detection unit 520. The conflict detection unit 530 identifies the frequency in which conflicts or potential conflict exists and identifies the iterations in the loop where such conflicts or potential conflicts occur. According to an embodiment of the present disclosure, the conflict detection unit 530 determines whether a loop should be partitioned and vectorized in response to the results from conflict detection. For example, if the occurrence of conflicts exceeds a predetermined number, the conflict detection unit 530 may determine that instead of partitioning and vectorizing the loop, the code for the loop should be directed to a scalar processor and not be changed.

The vectorization unit 500 includes a code vectorization unit 540. The code vectorization unit 540 converts a scalar implementation of intermediate language code which processes a single pair of operands at a time to a vector implementation which processes one operation on multiple pairs of operands at once. According to an embodiment of the present disclosure, the code vectorization unit 540 transforms loops into sequences of vector operations. Loop vectorization converts procedural loops that iterate over multiple pairs of data items and assigns a separate processing unit to each pair.

The vectorization unit 500 includes a partitioning unit 550. The partitioning unit 550 partitions the vectorized loop generated by code vectorization unit 540 according to information from the conflict detection unit 530 identifying iterations in the vectorized loop where a conflict or potential conflict exists. According to an embodiment of the present disclosure, the partitioning unit 550 inserts one or more vector partitioning loops inside the vectorized loop to perform dynamic partitioning. It should be appreciated that the vectorization unit 540 and partitioning unit 550 may operate as one unit and work together to vectorize and partition the loop code.

Figure 6:
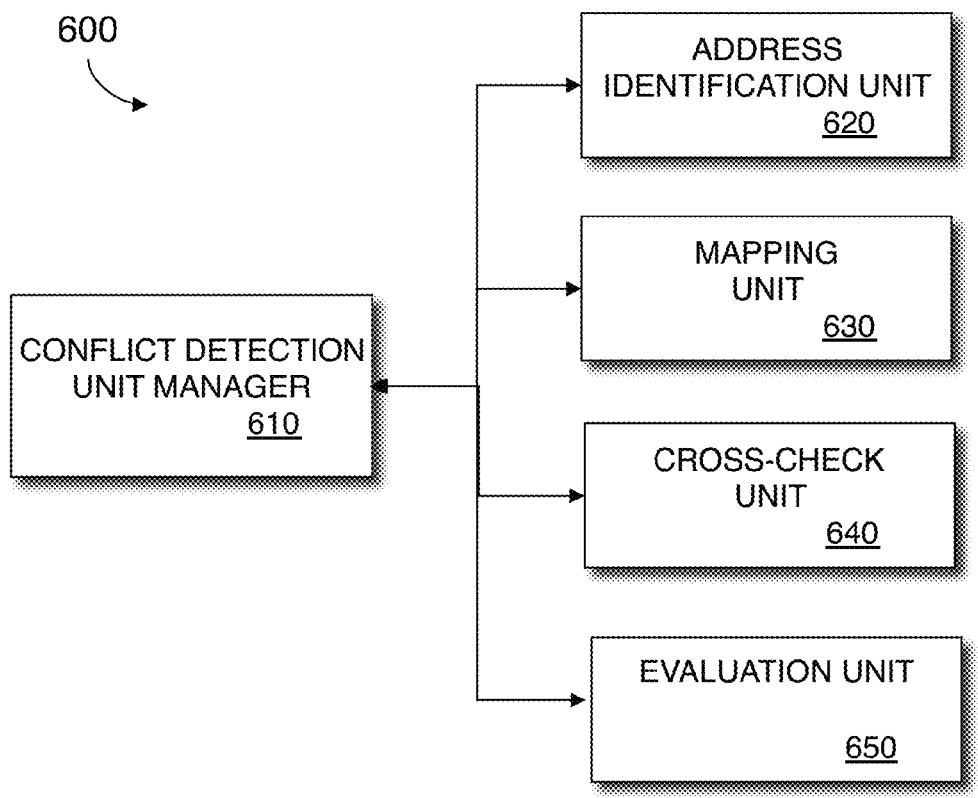
FIG. 6 is a block diagram of a conflict detection unit according to an embodiment of the present disclosure.

FIG. 6 is a block diagram of a conflict detection unit 600 according to an exemplary embodiment of the present disclosure. The conflict detection unit 600 may be used to implement the conflict detection unit 530 shown in FIG. 5. The conflict detection unit 600 includes a conflict detection unit manager 610. The conflict detection unit manager 610 is coupled to and transmits information between components in the conflict detection unit 600.

The conflict detection unit 600 includes an address identification unit 620. The address identification unit 600 identifies starting addresses and ending addresses for ranges of memory accessed by loop code. According to an embodiment of the present disclosure, starting and ending addresses may be computed from arrays of starting addresses and an integer value denoting a range width of a memory range. It should be appreciated that other identification techniques may be utilized depending on a format in which the memory range is presented.

The conflict detection unit 600 includes a mapping unit 630. The mapping unit 630 maps an array of the starting address and an array of an ending address for the ranges of memory into a smaller fixed set of data. According to an embodiment of the present disclosure, the starting and ending addresses may be seen as being allocated into buckets by masking the lower bits of the addresses. The mapping unit 630 may utilize a hashing technique for mapping the arrays of addresses into the smaller fixed set of data.

According to an embodiment, the conflict detection unit manager 610 identifies a number of conflict detection procedures to be utilized by the conflict detection unit 600. The identification may be made in response to user input, automatically by using a static cost model, or other technique. In response to the number of conflict detection procedures to be utilized, the mapping unit 630 determines a size of the smaller fixed set of data to map the arrays of starting and ending addresses.

The conflict detection unit 600 includes a cross-check unit 640. The cross-check unit 640 cross-checks the mapped array of starting addresses and mapped array of ending addresses for the ranges of memory using a conflict detection procedure that detects across-iteration dependency for arrays of a single memory address. The conflict detection procedure may be an instruction that performs runtime memory aliasing checks to facilitate vectorization. For example, a conflict detection instruction vconflict (v1, v2) may take two vector registers, v1 and v2, that includes the memory addresses to be checked, and outputs a mask or predicate that describes cross-iteration memory dependencies.

According to an embodiment of the present disclosure, when an identified number of conflict detection procedures to be utilized is four, the conflict detection unit 600 inputs the following combination of vectors into the conflict detection instruction where vStartBuckets represents the mapped array of starting addresses and vEndBuckets represents the mapped array of ending addresses of the range of memory accessed by the loop.

k1=vconflict(vStartBuckets, vStartBuckets)
k2=vconflict(vStartBuckets, vEndBuckets)
k3=vconflict(vEndBuckets, vStartBuckets)
k4=vconflict(vEndBuckets, vEndBuckets)

The conflict detection unit 600 includes an evaluation unit 650. The evaluation unit 650 combines the cross-check results to identify iterations in the vectorized loop that have potential conflicts. This information may be used to partition the vectorized loop to avoid erroneous results.

FIGS. 3-6 illustrate modules implementing embodiments of a virtual machine 300, a just-in-time compiler 400, a vectorization unit 500, and a conflict detection unit 600, respectively. According to one embodiment, the modules represent software modules and operations may be performed by a computer system such as the one illustrated in FIG. 2 executing sequences of instructions represented by the modules shown in FIGS. 3-6. In alternate embodiments, hard-wire circuitry may be used in place of or in combination with software instructions to implement embodiments of present disclosure. Thus, embodiments of present disclosure are not limited to any specific combination of hardware circuitry and software.

Figure 7:
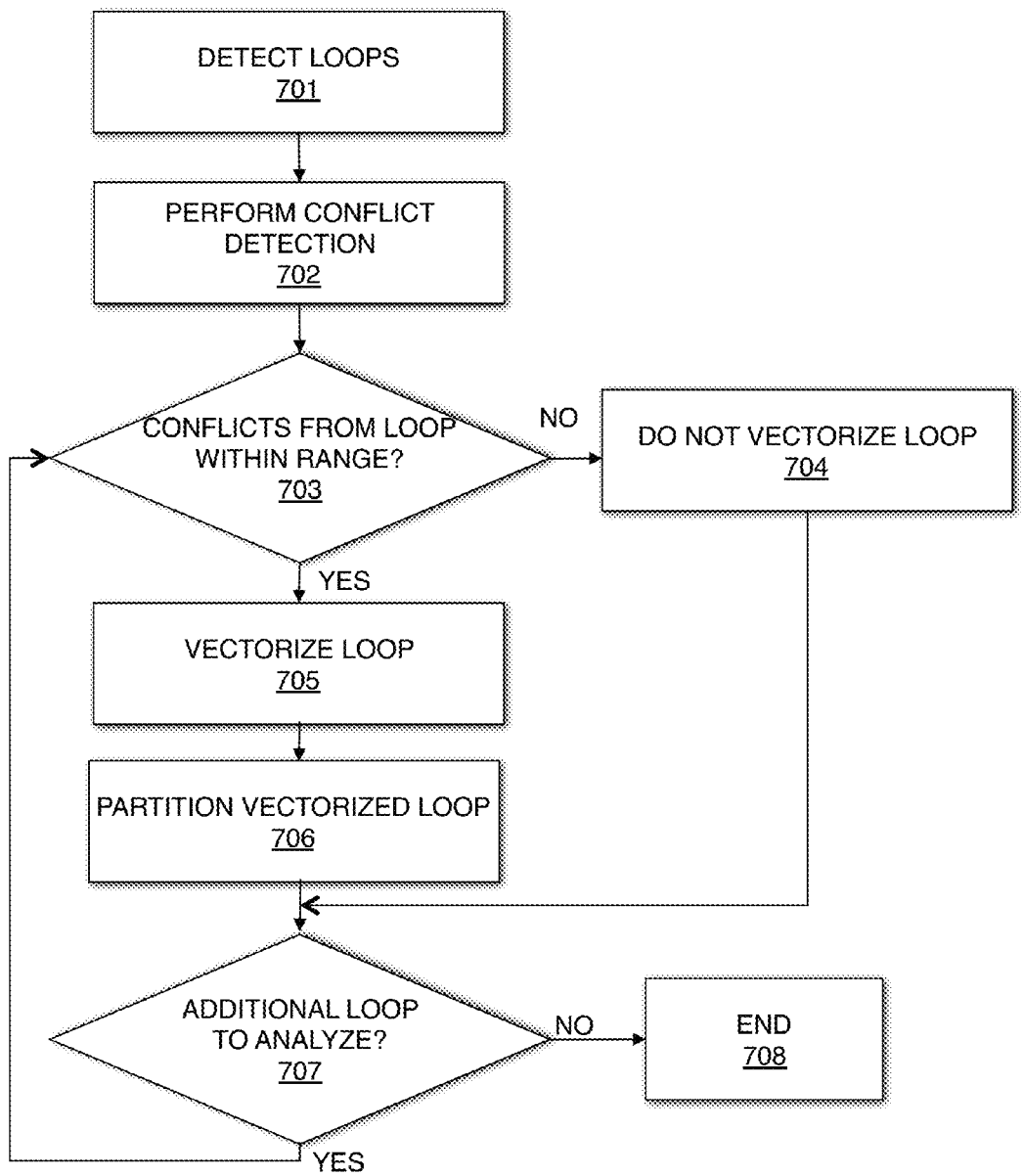
FIG. 7 is a flow chart illustrating a method for vectorizing code according to an exemplary embodiment of the present disclosure.

FIG. 7 is a flow chart illustrating a method for vectorizing code according to an exemplary embodiment of the present disclosure. The procedures described in FIG. 7 may be implemented by a compiler such as the just-in-time compiler 340 illustrated in FIG. 3.

At 701, loops in the code are detected. According to an embodiment of the present disclosure, the intermediate language code is parsed to identify loops. According to another embodiment of the present disclosure, intermediate language code with conflicts are identified.

At 702, conflicts in the identified loops are detected. A conflict arises when a memory address is accessed by more than one iteration in the loop. This may occur with a read after write, write after read, or write after write operation. According to an embodiment of the present disclosure, one or more iterations in a loop where a conflict or potential conflict exists is identified using a conflict detection procedure that detects across-iteration dependency for arrays of single memory addresses.

At 703, it is determined whether a current loop being evaluated should be vectorized in response to the conflict detection performed at 702. According to an embodiment of the present disclosure, a loop may be vectorized if the frequency of conflicts within a loop is below a predetermined value and/or the total number of conflicts in a loop is below a predetermined value. A static cost model, runtime profiler, or other mechanism may be utilized to assist in making this decision. It should be appreciated that other criteria may be considered to determine whether a loop should be vectorized. If it is determined that the current loop is not to be vectorized, control proceeds to 704. If it is determined that the current loop is to be vectorized, control proceeds to 705.

At 704, the code for the loop is not vectorized. The existing code for the loop is used to implement a scalar implementation of the loop.

At 705, code for the loop is vectorized. According to an embodiment of the present disclosure, a scalar implementation of intermediate language code which processes a single pair of operands at a time is converted to a vector implementation which processes one operation on multiple pairs of operands at once. The loop is transformed into sequences of vector operations. Loop vectorization converts procedural loops that iterate over multiple pairs of data items and assigns a separate processing unit to each pair.

At 706, the vectorized loop is partitioned in response to the identified iterations in the loop where a conflict or potential conflict exists. According to an embodiment of the present disclosure, one or more vector partitioning loops is implemented inside the vectorized loop to perform dynamic partitioning.

At 707, it is determined whether an additional loop needs to be analyzed. If no additional loop needs to be analyzed, control terminates the procedure at 708. If an additional loop needs to be analyzed, control proceeds to 703.

Figure 8:
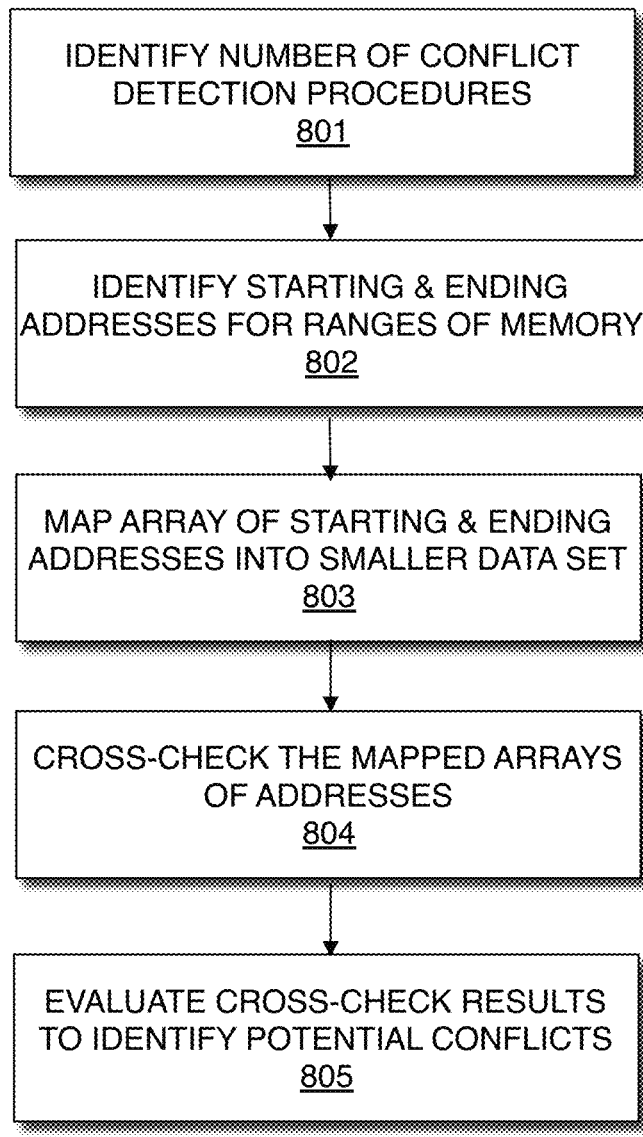
FIG. 8 is a flow chart illustrating a method for detecting potential overlap in memory ranges according to an exemplary embodiment of the present disclosure.

FIG. 8 is a flow chart illustrating a method for detecting conflict according to an embodiment of the present disclosure. The method described in FIG. 8 may be used to implement procedure 702 illustrated in FIG. 7. According to an embodiment of the present disclosure, detecting conflict involves detecting overlap in memory ranges according to an exemplary embodiment of the present disclosure.

At 801, a number of conflict detection procedures to be utilized is identified. According to an embodiment of the present disclosure, the identification may be made in response to user input, automatically by using a static cost model, or other technique.

At 802, starting addresses and ending addresses for ranges of memory accessed by loop code are identified. According to an embodiment of the present disclosure, starting and ending addresses may be computed from arrays of starting addresses and an integer value denoting a range width of a memory range. It should be appreciated that other identification techniques may be utilized depending on a format in which the memory range is presented.

At 803, an array of the starting addresses and an array of an ending addresses for the ranges of memory are mapped into a smaller fixed set of data. According to an embodiment of the present disclosure, the starting and ending addresses may be seen as being allocated into buckets by masking the lower bits of the addresses. A hashing technique may be utilized for mapping the arrays of addresses into the smaller fixed set of data. The size of the smaller fixed set of data to map the arrays of starting and ending addresses may be determined in response to the number of conflict detection procedures identified.

At 804, the mapped array of starting addresses and mapped array of ending addresses are cross-checked for the ranges of memory. According to an embodiment of the present disclosure, the mapped arrays are cross-checked using a conflict detection procedure that detects across-iteration dependency for arrays of a single memory address. The conflict detection procedure may be an instruction that performs runtime memory aliasing checks to facilitate vectorization. For example, the conflict detection instruction vconflict (v1, v2) may take two vector registers, v1 and v2, that includes the memory addresses to be checked, and outputs a mask or predicate that describes cross-iteration memory dependencies.

According to an embodiment of the present disclosure, when an identified number of conflict detection procedures to be utilized is four, the following combination of vectors into the conflict detection instruction where vStartBuckets represents the mapped array of starting addresses and vEndBuckets represents the mapped array of ending addresses of the range of memory accessed by the loop.

k1=vconflict(vStartBuckets, vStartBuckets)
   k2=vconflict(vStartBuckets, vEndBuckets)
   k3=vconflict(vEndBuckets, vStartBuckets)
   k4=vconflict(vEndBuckets, vEndBuckets)

At 805, the cross-check results are evaluated to identify iterations in the vectorized loop that have potential conflicts. This information may be used to partition the vectorized loop to avoid erroneous results.

Consider the following exemplary loop which cannot be successfully parallelized by traditional vectorization due to potential memory conflicts during runtime.

```
for ( i = 0; i< N-1; i ++) {
  j = B[i];
  /*... Reads from A[j:j+M]...*/
  /*... Writes to A[j:j+M]...*/
}
```

Full vectorization of the loop above would not be feasible due to the possibility of memory aliasing between read locations A[j2:j2+M] and write locations A[j1:j1+M], where M is 8, the range width is M+1=9, j1=B[i1], j2=B[i2], and scalar iteration i1 precedes i2.

The method described with reference to FIG. 8 may be used to approximate potential conflicts. The approximation method requires fewer conflict detection procedures to be implemented and consequently can yield higher performance. Traditional usage of conflict detection procedures requires $\Theta(NM^2)$ conflict detection procedures, whereas embodiments of the present disclosure requires only $\Theta(N)$ conflict detection procedures, where N is the total number of possible pairings of memory ranges checked for a given loop and M is the range width.

Referring to FIG. 8, at 801 it may be determined that four conflict detection procedures are to be used to identify conflicts in the loop.

At 802, starting and ending addresses of the memory ranges accessed by the code are identified. The addresses are inserted into arrays. According to an embodiment of the present disclosure, the starting and ending addresses of the memory ranges may be computed with the following pseudo code.

```
vStart = B[i:i + VL −1]; /*VL is the vector length*/
vM=vBroadast(M);
vEnd = vAdd(vStart, vM);
```

At 803, the arrays of starting and ending addressees are mapped to a smaller data set. The mapping of the arrays into a smaller data set can be seen as mapping the starting and ending addresses into a set of buckets by masking some of the lower bits of the addresses. The number of lower bits to mask depends on the length of each range width, M+1, and the number of conflict detection procedures identified at 801. For example, if 4 conflict detection instructions are to be used, the number of lower bits to be masked is ⌈log₂(M+1)⌉. If 2 conflict detection instructions are to be used, the number of lower bits to be masked is ⌈log₂(M+1)⌉+1. According to an embodiment of the present disclosure, the mapping of the arrays of starting and ending addresses may be achieved with the following pseudo code.

```
numShifts = ⌈log₂(M+1)⌉; /*Hashing function for 4 conflict detection
              procedures*/
vStartBuckets = vShiftRight (vStart, numShifts);
vEndBuckets = vShiftRight (vEnd, numShifts);
```

According to an alternate embodiment of the present disclosure, when two conflict detection procedures are to be used, numShifts=⌈log₂(M+1)⌉+1. When using only two conflict detection instructions, the size of the data set to which the arrays of starting and ending addresses are mapped to is increased by a factor of two. As shown below, this decreases the number of cross-checks required.

At 804, the mapped arrays of addresses are cross-checked using a conflict detection procedure that detects across-iteration dependency for arrays of single memory addresses. For this example, four cross-checks are performed by applying the conflict detection procedure to the mapped arrays of starting addresses and ending addresses. According to an embodiment of the present disclosure, cross-checking the mapped arrays of starting and ending addresses may be achieved with the following pseudo code when four conflict detection procedures are to be used.

```
k1 = vconflict (vStarBuckets, vStartBuckets);
k2 = vconflict (vStarBuckets, vEndBuckets);
k3 = vconflict (vEndBuckets, vStartBuckets);
k4 = vconflict (vEndBuckets, vEndBuckets);
```

According to an alternate embodiment of the present disclosure, cross-checking the mapped arrays of starting and ending addresses may be achieved with the following pseudo code when two conflict detection procedures are to be used.

```
k1 = vconflict (vStarBuckets, vStartBuckets);
k2 = vconflict (vEndBuckets, vEndBuckets);
```

By mapping the arrays of starting and ending addresses onto a larger set of data, the two diagonal cross-checks (i.e., between two different vector registers) become unnecessary. This is true since if two memory ranges intersect where the start address of one of the two intersecting ranges is mapped to a different bucket, then it should also be true that both starting and ending addresses of the other range would be mapped to the same bucket. When this occurs, the non-diagonal cross-checks would detect the potential conflict.

At 805, the cross-checked results are evaluated to identify potential conflicts. The four outputs from the cross-checking may be combined using a bitwise OR operation to produce a mask value that includes information identifying all potential conflicting memory locations. According to an embodiment of the present disclosure, the combining of the cross-check results may be achieved with the following pseudo code when four conflict detection procedures are to be used.

kConflict=k1|k2|k3|k4;

According to an alternate embodiment of the present disclosure, when 2 conflict detection procedures are to be used, kConflict=k1|k2.

FIGS. 7 and 8 are flow charts illustrating methods according to exemplary embodiments of the present disclosure. Some of the techniques illustrated in these figures may be performed sequentially, in parallel or in an order other than that which is described. It should be appreciated that not all of the techniques described are required to be performed, that additional techniques may be added, and that some of the illustrated techniques may be substituted with other techniques.

FIG. 9 illustrates a first example of performing conflict detection according to an exemplary embodiment of the present disclosure. Returning to the example above, suppose the index values of j=B[i] for four scalar iterations are given as illustrated in FIG. 9. When four conflict detection procedures are determined to be utilized, the values of the mapped array of starting addresses and mapped array of ending addresses, and cross-check results are illustrated in FIG. 9. The final output conflict mask, kConflict, signifies the presence of two potential conflicts. A first potential conflict occurs between iterations i=0 and i=1. A second potential conflict occurs between iterations i=2 and i=3. The first detected conflict is a false positive, because interval[16:24] does not intersect with interval[28:36]. The second detected conflict is an actual conflict with interval[68:76] intersecting interval[74:82].

FIG. 10 illustrates a second example of performing conflict detection according to an exemplary embodiment of the present disclosure. Returning to the example above, suppose the index values of j=B[i] for four scalar iterations are given as illustrated in FIG. 10. When two conflict detection procedures are determined to be utilized, the values of the mapped array of starting addresses and mapped array of ending addresses, and cross-check results are illustrated in FIG. 10. The final output conflict mask, kConflict, signifies the presence of two potential conflicts. A first potential conflict occurs between iterations i=0 and i=1. A second potential conflict occurs between iterations i=2 and i=3. The first detected conflict is a false positive, because interval[16:24] does not intersect with interval[30:38]. The second detected conflict is an actual conflict with interval[74:92] intersecting interval[90:98].

According to an embodiment of the present disclosure, flexibility regarding the selection of a number of conflict detection procedures to use based on the manner in which the starting addresses and ending addresses of ranges of memories are mapped. Given that the value W represents a range's width/length in memory, and N is a number of shifts needed to map the starting and ending addresses into a smaller set of data (buckets). When W=12, the next address alignment would be 16. Therefore, N=log 16, which results in 4 shifts for the 4 instructions approach, and 5 shifts for the 2 instructions approach.

The following examples pertain to further embodiments. In one embodiment, a computer-implemented method for managing loop code in a compiler uses a conflict detection procedure that detects across-iteration dependency for arrays of single memory addresses to determine whether a potential across-iteration dependency exists for arrays of memory addresses that identify ranges of memory accessed by the loop code.

In a further embodiment, the range of memory in the above-referenced method includes a block of contiguous memory addresses.

In a further embodiment, the across iteration dependency in the above-referenced method includes one of a read after write, write after write, and write after read dependency.

In a further embodiment, the conflict detection procedure for the arrays of single memory addresses in the above-referenced method identifies duplicate values stored between two arrays of single memory addresses.

In a further embodiment, the above-referenced method further includes identifying a starting address and ending address of the ranges of memory.

In a further embodiment, the above-referenced method further includes mapping an array of starting addresses and an array of ending addresses for the ranges of memory into a smaller set of data.

In a further embodiment, the above-referenced method further includes identifying a number of times to execute the conflict detection procedure.

In a further embodiment, the identifying in the above-referenced method is performed in response to user input.

In a further embodiment, the identifying in the above-referenced method is performed automatically by the compiler using a static cost model.

In a further embodiment, the above-referenced method further includes mapping an array of starting addresses and an array of ending addresses for the ranges of memory addresses into a smaller set of data, wherein a size of the smaller set of data is determined from an identified number of times to execute the conflict detection procedure or a hashing function.

In a further embodiment, the above-referenced method includes cross-checking with the conflict detection procedure on a mapped array of starting addresses and a mapped array of ending addresses for the ranges of memory.

In a further embodiment, the above-referenced method includes identifying potential across-iteration dependency for the ranges of memory described in the loop code using the cross checking results.

In a further embodiment, the above-referenced method includes partitioning loop code for vectorization in response to the potential across-iteration dependency identified.

In a further embodiment, a non-transitory computer-readable medium having sequences of instructions, the sequences of instructions including instructions which, when executed, causes a processor to perform the method of any of the above disclosed embodiments.

In a further embodiment, a non-transitory computer-readable medium having sequences of instructions, the sequences of instructions including instructions which, when executed, cause a processor to perform a method that uses a conflict detection procedure that detects across-iteration dependency for arrays of single memory addresses to determine whether a potential across-iteration dependency exists for arrays of memory addresses that identify ranges of memory accessed by loop code.

In a further embodiment, the conflict detection procedure for the arrays of single memory addresses in the above-identified computer-readable medium identifies duplicate values stored between two arrays of single memory addresses.

In a further embodiment, the above-identified computer-readable medium further includes identifying a starting address and ending address of the ranges of memory.

In a further embodiment, the above-identified computer-readable medium further includes mapping an array of starting addresses and an array of ending addresses for the ranges of memory addresses into a smaller set of data, wherein a size of the smaller set of data is determined from an identified number of times to execute the conflict detection procedure.

In a further embodiment, the above-identified computer-readable medium further includes performing cross-checking with the conflict detection procedure on a mapped array of starting addresses and a mapped array of ending addresses for the ranges of memory.

In a further embodiment, the above-identified computer-readable medium further includes identifying potential across-iteration dependency for the ranges of memory described in the loop code using the cross checking results.

In a further embodiment, the above-identified computer-readable medium further includes partitioning the loop code for vectorization in response to the potential across-iteration dependency identified.

In a further embodiment, a conflict detection unit includes an address identification unit that identifies starting addresses and ending addresses for ranges of memory accessed by loop code. The conflict detection unit includes a mapping unit that maps an array of the starting addresses and an array of the ending addresses for the ranges of memory into a smaller set of data. The conflict detection unit includes a cross-check unit that cross-checks a mapped array of starting addresses and a mapped array of ending addresses for the ranges of memory with a conflict detection procedure that detects across-iteration dependency for arrays of single memory addresses. The conflict detection unit includes an evaluation unit that determines whether a potential across-iteration dependency exists for the ranges of memory accessed by the loop code from results of the cross-checking.

In a further embodiment, the mapping unit in the above-identified conflict detection unit determines a size of the set of data from an identified number of times the conflict detection procedure is to be executed.

In a further embodiment, the above-identified conflict detection unit further includes a conflict detection unit manager that identifies a number of times the conflict detection procedure is to be executed in response to user input.

In a further embodiment, the above-identified conflict detection unit further includes a conflict detection unit manager that identifies a number of times the conflict detection procedure is to be executed by using a static cost model.

In a further embodiment, the mapping unit in the above-identified conflict detection unit maps the array of the starting addresses and the array of the ending addresses by using a hash function.

In a further embodiment, an apparatus for performing conflict detection includes means for identifying starting addresses and ending addresses for ranges of memory accessed by loop code. The apparatus includes means for mapping an array of the starting addresses and an array of the ending addresses for the ranges of memory into a smaller set of data. The apparatus includes means for cross-checking a mapped array of starting addresses and a mapped array of ending addresses for the ranges of memory with a conflict detection procedure that detects across-iteration dependency for arrays of single memory addresses. The apparatus includes means for determining whether a potential across-iteration dependency exists for the ranges of memory accessed by the loop code from results of the cross-checking.

In a further embodiment, the means for mapping in the above-identified apparatus determines a size of the set of data from an identified number of times the conflict detection procedure is to be executed.

In a further embodiment, the above-identified apparatus further includes means for identifying a number of times the conflict detection procedure is to be executed in response to user input.

In a further embodiment, the above-identified apparatus further includes means for identifying a number of times the conflict detection procedure is to be executed by using a static cost model.

In a further embodiment, the means for mapping in the above-identified apparatus uses a hash function.

Embodiments of the present disclosure may be provided as a computer program product, or software, that may include an article of manufacture on a machine accessible or machine readable medium having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

In the foregoing specification embodiments of the disclosure have been described with reference to specific exemplary embodiments thereof. It will, however, be evident that various modifications and changes may be made thereto without departing from the embodiments of the disclosure. Furthermore, it should be appreciated that specifics in the examples presented may be used anywhere in one or more of the disclosed embodiments.

What is claimed is:

1. A non-transitory computer-readable medium having sequences of instructions, the sequences of instructions including instructions which, when executed, cause a processor to perform a method, comprising:

identifying a number of times to execute a conflict detection procedure based on one of a static cost model and user input, wherein the conflict detection procedure detects across-iteration dependency for arrays of single memory addresses;

mapping an array of starting addresses and an array of ending addresses for ranges of memory addresses into a set of data with a determine size of the set, wherein the size of the set of data is determined from the identified number of times to execute the conflict detection procedure;

using the conflict detection procedure to determine whether a potential across-Iteration dependency exists for arrays of memory addresses that identify the ranges of memory accessed by loop code; and in response to the identified potential across-iteration dependency, vectorizing loops to optimize execution.

2. The non-transitory computer-readable medium of claim 1, wherein the conflict detection procedure for the arrays of single memory addresses identifies duplicate values stored between two arrays of single memory addresses.

3. The non-transitory computer-readable medium of claim 1, wherein the method further comprises identifying a starting address and ending address of the ranges of memory.

4. The non-transitory computer-readable medium of claim 1, wherein the method further comprises performing cross-checking with the conflict detection procedure on a mapped array of starting addresses and a mapped array of ending addresses for the ranges of memory.

5. The non-transitory computer-readable medium of claim 4, wherein the method further comprises identifying potential across-iteration dependency for the ranges of memory described in the loop code using the cross checking results.

6. The non-transitory computer-readable medium of claim 5, wherein the method further comprises partitioning the loop code for vectorization in response to the potential across-iteration dependency identified.

7. A computer-implemented method for managing loop code in a compiler, comprising:

identifying a number of times to execute a conflict detection procedure that detects across-iteration dependency for arrays of single memory addresses;

mapping an array of starting addresses and an array of ending addresses for a ranges of memory into a set of data, wherein a size of the set of data is determined from the identified number of times to execute the conflict detection procedure;

using the conflict detection procedure to determine whether a potential across-Iteration dependency exists for arrays of memory addresses that identify the ranges of memory accessed by the loop code; and in response to the identified potential across-iteration dependency, vectorizing loops to optimize execution.

8. The method of claim 7, wherein the range of memory comprises a block of contiguous memory addresses.

9. The method of claim 7, wherein the across iteration dependency includes one of a read after write, write after write, and write after read dependency.

10. The method of claim 7, wherein the conflict detection procedure for the arrays of single memory addresses identifies duplicate values stored between two arrays of single memory addresses.

11. The method of claim 7 further comprising identifying a starting address and ending address of the ranges of memory.

12. The method of claim 7 further comprising performing cross-checking with the conflict detection procedure on a mapped array of starting addresses and a mapped array of ending addresses for the ranges of memory.

13. The method of claim 12 further comprising identifying potential across-iteration dependency for the ranges of memory described in the loop code using the cross checking results.

14. The method of claim 13 further comprising partitioning the loop code for vectorization in response to the potential across-iteration dependency identified.

15. The method of claim 7, wherein the identifying is performed in response to user input.

16. The method of claim 7, wherein the identifying is performed automatically by the compiler using a static cost model.

17. A conflict detection unit, comprising;
a conflict detection unit manager operable to identify a number of times a conflict detection procedures, that detects across-iteration dependency for arrays of single memory addresses, is to be executed;
an address identification unit operable to identify starting addresses and ending addresses for ranges of memory accessed by loop code;
a mapping unit operable to map an array of the starting addresses and an array of the ending addresses for the ranges of memory into a set of data, wherein a size of the set of data is determined from the identified number of times to execute the conflict detection procedure;
a cross-check unit operable to cross-check a mapped array of starting addresses and a mapped array of ending addresses for the ranges of memory with the conflict detection procedure; and
an evaluation unit operable to determine whether a potential across-iteration dependency exists for the ranges of memory accessed by the loop code from results of the cross-checking, wherein loops are vectorized to optimize execution in response to identified potential across-iteration dependency, wherein at least one of the address identification unit, mapping unit, cross-check unit, and evaluation unit is implemented with a processor.

18. The conflict detection unit of claim 17, wherein the mapping unit is operable to determine a size of the set of data from an identified number of times the conflict detection procedure is to be executed.

19. The conflict detection unit of claim 17 further comprising a conflict detection unit manager operable to identify a number of times the conflict detection procedure is to be executed in response to user input.

20. The conflict detection unit of claim 17, wherein the conflict detection unit manager identifies the number of times the conflict detection procedure is to be executed by using a static cost model.

21. The conflict detection unit of claim 17, wherein the mapping unit is operable to map the array of the starting addresses and the array of the ending addresses by using a hash function.

* * * * *